(12) United States Patent
Nagappan et al.

(10) Patent No.: US 7,926,036 B2
(45) Date of Patent: Apr. 12, 2011

(54) TECHNOLOGIES FOR CODE FAILURE PRONENESS ESTIMATION

(75) Inventors: Nachiappan Nagappan, Redmond, WA (US); Thirumalesh Bhat, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 11/740,722

(22) Filed: Apr. 26, 2007

(65) Prior Publication Data

US 2008/0271006 A1 Oct. 30, 2008

(51) Int. Cl.
*G06F 9/44* (2006.01)
*G06F 9/445* (2006.01)

(52) U.S. Cl. .......................... 717/124; 717/128; 717/130

(58) Field of Classification Search ........... 717/124–131
See application file for complete search history.

(56) References Cited

U.S. PATENT DOCUMENTS

| | | | | |
|---|---|---|---|---|
| 5,414,809 A * | 5/1995 | Hogan et al. | ................. | 715/765 |
| 5,729,746 A * | 3/1998 | Leonard | ...................... | 717/101 |
| 5,915,114 A * | 6/1999 | McKee et al. | ................. | 717/128 |
| 5,960,196 A * | 9/1999 | Carrier et al. | ................. | 717/122 |
| 5,970,246 A * | 10/1999 | Moughani et al. | ............ | 717/128 |
| 6,192,511 B1 * | 2/2001 | Johnston et al. | .............. | 717/109 |
| 6,219,805 B1 * | 4/2001 | Jones et al. | ...................... | 714/38 |
| 6,477,666 B1 * | 11/2002 | Sanchez et al. | ................. | 714/41 |
| 6,516,460 B1 * | 2/2003 | Merks et al. | ..................... | 717/124 |
| 6,721,941 B1 * | 4/2004 | Morshed et al. | .............. | 717/127 |
| 6,785,848 B1 * | 8/2004 | Glerum et al. | ................. | 714/38 |
| 6,986,124 B1 * | 1/2006 | Field et al. | ..................... | 717/124 |
| 7,240,335 B2 * | 7/2007 | Angel et al. | ................... | 717/130 |
| 7,322,026 B2 * | 1/2008 | Ahluwalia et al. | ............ | 717/124 |
| 7,401,323 B2 * | 7/2008 | Stall et al. | ....................... | 717/130 |
| 7,685,574 B2 * | 3/2010 | Brumme et al. | .............. | 717/130 |
| 7,725,881 B2 * | 5/2010 | Bhat et al. | ...................... | 717/124 |
| 7,797,684 B2 * | 9/2010 | Prakash | ......................... | 717/127 |

OTHER PUBLICATIONS

Michael, "Using evolution constraints to access the failure proneness of evolving software", IEEE, pp. 48-51, 1997.*
Gitzel et al, "Towards a software failure cost impact model for the customer", ACM PROMISE, pp. 1-9, 2010.*
Schroter et al, "Predicting component failure at design time", ACM ISESE, pp. 18-27, 2006.*
Nagappan et al, "The influence of organizational structure on software quality: An emprical case study", ACM ICSE, pp. 521-530, 2008.*
V.R. Basili, et al; "A Validation of Object Orient Design Metrics as Quality Indicators"; IEEE Transactions on Software Engineering; pp. 751-761; 1996.
L.C. Briand, et al; "Exploring the Relationship Between Design Measures and Software Quality in Object Oriented Systems"; Journal of Systems and Software; pp. 245-273, 2000.

(Continued)

*Primary Examiner* — Anil Khatri
(74) *Attorney, Agent, or Firm* — L. Alan Collins; Collins & Collins Incorporated (57) ABSTRACT

The present examples provide technologies for estimating code failure proneness probabilities for a code set and/or the files that make up the set. The code set being evaluated is typically comprised of binary and/or source files that embody the software for which the estimates are desired. The estimates are typically based on a set of selected code metrics, the code metrics typically selected based on corresponding failures of a previous version of the software. A historically variant metric feedback factor may also be calculated and code metric values classified relative to a baseline code set embodying the previous version of the software.

16 Claims, 4 Drawing Sheets

OTHER PUBLICATIONS

L.C. Briand, et al; "Investigating Quality Factors in Object-Oriented Designs: An Industrial Case Study"; Proceedings of International Conference on Software Engineering; pp. 345-354, 1999.

S.R. Chidamber, et al; "A Metrics Suite for Object Oriented Design"; IEEE Transactions on Software Engineering; pp. 476-493; 1994.

N.I. Churcher, et al; "Comments on 'A Metrics Suite for Object-Oriented Design"; IEEE Transactions on Software Engineering; pp. 263-265; 1995.

G. Denaro, et al: "An Empirical Evaluation of Fault-Proneness Models"; Proceedings of International Conference on Software Engineering; pp. 241-251; 2002.

K. El Emam; et al; "The Confounding Effect of Class Size on the Validity of Object-Oriented Metrics"; IEEE Transactions on Software Engineering; pp. 630-650; 2001.

S.M. Henry, et al; "Software Structure Metrics Based on Information Flow"; IEEE Transactions on Software Engineering; pp. 510-518; 1981.

T. J. McCabe; "A Complexity Measure"; IEEE Transactions on Software Engineering; pp. 308-320; 1976.

N. Nagappan, et al; "Mining Metrics to Predict Component Failures"; Proceedings of International Conference on Software Engineering; pp. 452-461; 2006.

R. Subramanyam; "Empirical Analysis of CK Metrics for Object-Oriented Design Complexity: Implications for Software Defects"; IEEE Transactions on Software Engineering, vol. 29.; pp. 297-310; 2003.

M.H. Tang, et al; "An Empirical Study on Object-Oriented Metrics"; Proceedings of Sixth International Software metrics Symposium; pp. 242-249; 1999.

\* cited by examiner

TECHNOLOGIES FOR CODE FAILURE PRONENESS ESTIMATION

BACKGROUND

Estimating software quality is a major challenge for software development organizations. Having early estimates of software quality may help an organization to focus testing resources to minimize cost and maximize quality. But it can be difficult to select, calculate, and apply code metrics sufficient to determine useful failure proneness for software; that is, to estimate which software modules or files are more likely to experience failures during execution.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for estimating code failure proneness probabilities for a code set and/or the files that make up the set. The code set being evaluated is typically comprised of binary and/or source files that embody the software for which the estimates are desired. The estimates are typically based on a set of selected code metrics, the code metrics typically selected based on corresponding failures of a previous version of the software. A historically variant metric feedback factor may also be calculated and code metric values classified relative to a baseline code set embodying the previous version of the software.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments and the like.

Figure 1:
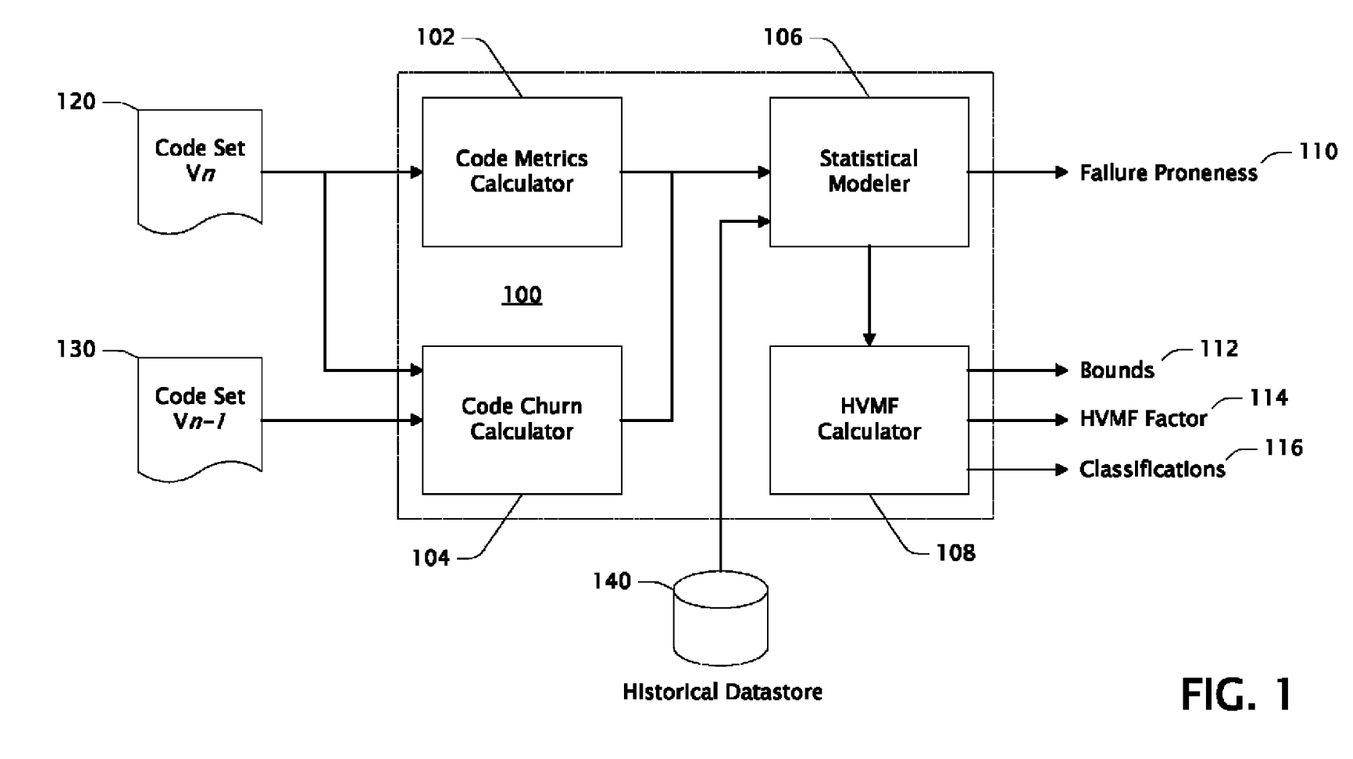
FIG. 1 is a block diagram showing an example code failure proneness estimation ("CFPE") system along with example inputs and example outputs.

FIG. 1 is a block diagram showing an example code failure proneness estimation ("CFPE") system 100 along with example inputs 120, 130, and 140 and example outputs 110, 112, 114, and 116. System 100 is typically comprised of code metrics calculator 102, code churn calculator 104, statistical modeler 106, and historically variant metric feedback ("HVMF") calculator 108. Elements 102, 104, 106, and 108 may be implemented as software modules, hardware modules, or any combination thereof. They may be implemented separately or in any combination or as part of another system or systems. The arrows shown interconnecting in the elements of system 100 FIG. 1 are examples of interactions and/or data flow between elements and are not intended as limiting. Other interactions and/or data flows may also exist.

Example code set version n 120 represents the code being analyzed for failure proneness. Such a code set is typically a collection of files, such as source or binary files or the like. Source files typically include source code, or code written in a format intended as the source for compilation or interpretation. Such source code may be written in an object-oriented language, a procedural language, a declarative language, an assembly language, or the like, or any combination thereof. Binary files typically include compiled code, machine code, binary machine code, intermediate code, machine-independent intermediate code, computer-executable code, or the like, or any combination thereof. In one example, code sets comprising binary files are preferable as they tend to more closely represent what a computer or the like executes.

In one example, code set 120 is comprised of between approximately 20 and 50 binary files. In other examples, code set 120 includes thousands of binary files. Any number of files may be used as code set 120 so long as the number of files provides a statistically significant set of code metrics. In general, a code set, such as code set 120, embodies a software product, feature, module, driver, or the like, or portion thereof. One code set, for example, may embody a particular version of an operating system or portion thereof. Another code set may embody a particular version of a word processor program or portion thereof.

Example code set version n−1 130 is typically a code set such as code set 120, but of a previous version of the software embodied in code set version n 120. For example, given a code set 120 of version 7 of an operating system, code set 130 may be of version 6 of the same operating system, or some other previous version. Code set 130 may also be referred to as a "baseline code set". Such a baseline code set may not be available and may not be required by system 100.

Example historical datastore 140 typically includes baseline data associated with baseline code sets such as code set 130. Baseline data typically includes code metrics calculated from such baseline code sets. For example, given a version 4 word processor software product, such a datastore may include code metrics data for baseline codes sets embodying versions 1, 2 and 3 of the product. Such a historical datastore may not be available and may not be required by system 100. Datastore 140 may be any storage mechanism sufficient to maintain code metrics data and provide system 100 with access to code metrics data, and may or may not be implemented as a part of system 100.

Example code metrics calculator 102 typically accepts as input code set 120 and processes each file of the code set to calculate selected code metrics. Selected code metrics may be determined by a user of system 100 via any suitable interface, such a user being a person and/or another system or the like. In one example, records of failures of a previous version of the software, such as embodied by a corresponding baseline code set, are stored and each failure is analyzed and associated with one or more code metrics deemed an indication of the failure. Generally, such code metrics are used to form the selected set of code metrics.

Code metrics may be grouped, classified, and sub-classified in any suitable arrangement. In one example, such code metrics are classified as object oriented code metrics and non-object oriented code metrics, and are further classified as function metrics, class metrics, and module metrics, as shown in Table 1 herein below.

TABLE 1

| Metric | Description |
| --- | --- |
| FunctionName | Indicates the undecorated name of a function. |
| FunctionAddress | Indicates the address of a function; helps distinguish two functions with the same undecorated name. |
| Paths | Indicates the number of paths for a given function. |
| Lines | Indicates the number of lines of code in a file. |
| Parameters | Indicates the number of parameters taken by a function. E.g.: void Foo(int a, int b); will return number 2 for the two parameters. |
| Locals | Indicates the number of local variables per function. This may be determined by binary analysis so compiler optimizations might report lesser number of local variables than defined in code. |
| Blocks & Arcs | Indicates the number of code blocks per function and number of arcs per function. A block, also known as a basic block, is set of contiguous instructions (code) in the physical layout of a binary that has exactly one entry point and one exit point. Calls, jumps, and branches mark the end of a block. A block typically consists of multiple machine-code instructions. The arcs of a basic block specify the basic blocks that call the entry point of the block, and the basic blocks that are called by the exit point of the block. Thus, the arcs of a block are all possible execution paths through the block. |
| ReadCoupling | Indicates the number of global variables read by a function and thus coupled to the global variable through read. |
| WriteCoupling | Indicates the number of global variables written by a function and thus coupled to the global variable through write. |
| AddressCoupling | Indicates the global variables whose address is taken by a function. The function is coupled to the global variable as it takes the address of the variable. |
| ProcCoupling | Calculated using global variables. If a global variable is set in FunctionA( ) and is modified in FunctionB( ) and FunctionC( ); a coupling value of 2 is shown for FunctionA( ). |
| FanIn | Indicates the number of other functions calling a given function in a module. |
| FanOut | Indicates the number of other functions being called from a given function in a module. |
| Cyclomatic Complexity | Indicates a value for complexity. In one example, the formula for this is: $e - n + 2p$, where e = number of edges, n = number of nodes, and p = number of unconnected parts of the graph. In another example, cyclomatic complexity is determined by looking at the conditionals and counting the blocks with more than one edge. |
| Methods | Indicates the number of methods in a class; this typically includes public, private and protected methods. |
| Inheritance Depth | Indicates the maximum depth of inheritance for a given class. This is typically determined by calculating the inheritance depth of each of the base classes and by taking the maximum inheritance depth. |
| Base Classes | Indicates the number of immediate base classes; this typically doesn't count the base classes through the inheritance hierarchy. |
| Coupling | Indicates coupling to other classes through: class member variables; function parameters; classes defined locally in class member function bodies; coupling through immediate base classes; coupling through return type. A class that is not visible because of compiler optimization is typically not |

TABLE 1-continued

| Metric | Description |
|---|---|
| | counted. Also a class is generally not counted twice; so if a class is coupled as a member variable and then through the function parameter; it is generally counted only once. |
| Class Member Coupling | Indicates the coupling to other classes through class data fields. |
| Function Local Coupling | Indicates the coupling to other classes through local variables defined in the stack of functions. |
| Function Params Coupling | Indicates the coupling to other classes through parameters that are passed into the function. |
| RetValue Coupling | Indicates the coupling to other classes through return value. E.g.: ClassA can return ClassB and there can be implicit conversions. |
| BaseClass Coupling | Indicates the coupling through base classes. E.g.: ClassC may inherit from ClassA and ClassB; in this example the coupling number will be 2. |
| Sub Classes | Indicates the number of classes directly inheriting from a given parent class in a module. This metric does not typically count classes with several inheritance. E.g.: ClassA is the base class of ClassB which is the base class for ClassC. ClassA is flagged as containing one sub class and ClassB is flagged as containing one sub class. |
| PublicMethods | Indicates the number of class methods denoted as being public. |
| ProtectedMethods | Indicates the number of class methods denoted as being protected. |
| PrivateMethods | Indicates the number of class methods denoted as being private. |
| ClassDataMembers | Indicates the number of data fields present in the class excluding the methods. |
| PubDataMembers | Indicates the number of public data members in a given class. |
| ProtDataMembers | Indicates the number of protected data members in a given class. |
| PvtDataMembers | Indicates the number of private data members in a given class. |
| ModuleName | Indicates the name of the module for which metrics are being collected. |
| TotalFunctions | Indicates the number of functions found in the module. |
| TotalClasses | Indicates the number of classes found in the module. |
| MaxPaths | Indicates the maximum number of paths found in a function in the given module. |
| TotalPaths | Indicates the number of paths found in all functions in the given module. |
| MaxLines | Indicates the maximum number of lines found in a function in the given module. |
| TotalLines | Indicates the number of lines found in all functions in the given module. |
| MaxParameters | Indicates the maximum number of parameters in a function in the given module. |
| TotalParameters | Indicates the number of parameters found in all the functions in the given module. |
| MaxLocals | Indicates the maximum number of local variables found in a function in the given module. |
| TotalLocals | Indicates the number of locals found in all the functions in the given module. |
| MaxArcs | Indicates the maximum number of arcs found in a function in the given module. |
| TotalArcs | Indicates the number of arcs found in all the functions in the given module. |
| MaxBlocks | Indicates the maximum number of blocks found in a function in the given module. |
| TotalBlocks | Indicates the number of blocks found in all the functions in the given module. |
| MaxReadCoupling | Indicates the maximum coupling of global variables through read in a function in the given module. |
| TotalReadCoupling | Indicates the coupling of global variables through read using all the functions in the given module. |
| MaxWriteCoupling | Indicates the maximum coupling of global variables through write in a function in a given module. |
| TotalWriteCoupling | Indicates the coupling of global variables through write through all functions in the given module. |

TABLE 1-continued

| Metric | Description |
| --- | --- |
| MaxAddrTaken | Indicates the coupling where the address of a global variable is taken in a function in a given module. |
| TotalAddrTaken | Indicates the coupling of global variables for all functions in a given module where the address of a global variable is taken. |
| MaxProcCoupling | Indicates the coupling between procedures through global variables; shows the function that has the maximum coupling to other functions in a given module. |
| TotalProcCoupling | Indicates the coupling between procedures counted as aggregated for all the functions in a given module. |
| MaxFanIn | Indicates the total number of other functions calling the given function in a given module; the maximum for a given function in a given module. |
| TotalFanIn | Indicates the Fanin that is accumulated for all functions in the given module. |
| MaxFanOut | Indicates the number of other functions that are being called from a given function in the given module. This metric gives the maximum such calls being made from a given function. |
| TotalMaxFanOut | Indicates the number of other functions being called from the given function in a given module; the maximum for a given function in a given module. |
| MaxComplexity | Indicates the maximum cyclomatic complexity found in a function in a given module. |
| TotalComplexity | Indicates the total cyclomatic complexity found in all the functions in a given module. |
| MaxClassMethods | Indicates the total number of methods in a given class compared to all the classes in a given module. |
| TotalClassMethods | Indicates the total number of class methods when aggregated over all the classes in a given module. |
| MaxInheritanceDepth | Indicates the maximum inheritance depth when looking at all the classes in a given module. |
| TotalInheritanceDepth | Indicates the total inheritance depth when combining all the classes in a given module. |
| MaxBaseClasses | Indicates the maximum number of base classes when looking at all the classes in a given module. |
| TotalBaseClasses | Indicates the total number of base classes when looking at all the classes in a given module. |
| MaxClassCoupling | Indicates the maximum class coupling for a given class when looking at all the classes in a given module. |
| TotalClassCoupling | Indicates the total number for coupling when looking at all the classes in a given module. |
| MaxClassMemberCoupling | Indicates the maximum coupling to other classes through class data fields. |
| TotalClassMemberCoupling | Indicates the sum of all data field coupling found in all classes in the module. |
| MaxFunctionLocalCoupling | Indicates the maximum coupling to other classes through local variables defined in the function stack found in all classes in a given module. |
| TotalFunctionLocalCoupling | Indicates the total function local coupling for all classes in the module. |
| TotalFunctionParamsCoupling | Indicates the coupling to other classes through parameters that are passed into the function. |
| MaxRetValueCoupling | Indicates the coupling to other classes through return value. E.g.: ClassA can return ClassB and there can be implicit conversions. |
| TotalRetValueCoupling | Indicates the total coupling to all the other classes through return value found for all the classes in the module. |
| MaxBaseClassCoupling | Indicates the coupling through base classes. E.g.: ClassC may inherit from ClassA and ClassB; in this case the coupling number will be two. The maximum value of such coupling is returned through this metric. |
| TotalBaseClassCoupling | Indicates the total coupling through bases classes when aggregated for all the classes in the module. |
| MaxSubClasses | Indicates the maximum number of sub classes given a class when looking at all the classes in a given module. |
| TotalSubClasses | Indicates the total number of sub classes when looking at all the classes in a given module. |
| MaxPublicMethods | Indicates the maximum number of public methods in a given class when looking at all the classes in a given module. |

TABLE 1-continued

| Metric | Description |
| --- | --- |
| TotalPublicMethods | T Indicates the he total number of public methods when looking at all the classes in a given module. |
| MaxProtectedMethods | Indicates the maximum number of protected methods when looking at all the classes in a given module. |
| TotalProtectedMethods | Indicates the total number of protected methods when aggregated for all the classes in a given module. |
| MaxPrivateMethods | Indicates the maximum number of private methods when looking at all the classes in a given module. |
| TotalPrivateMethods | Indicates the total number of private methods when looking at all the classes in a given module. |
| MaxClassDataMembers | Indicates the maximum number of data members for a given class in a given module. |
| TotalClassDataMembers | Indicates the total number of class data members when aggregated across an entire module. |
| MaxPubDataMembers | Indicates the maximum number of public data members for a given class in a given module. |
| TotalPubDataMembers | Indicates the total number of public data members for all the classes in a given module. |
| MaxProtDataMembers | Indicates the maximum number of protected data members for a given class in a given module |
| TotalProtDataMembers | Indicates the total number of protected data members for all the classes in a given module. |
| MaxPvtDataMembers | Indicates the maximum number of private data members for a given class in a given module. |
| TotalPvtDataMembers | Indicates the total number of private data members for all the classes in a given module. |
| TotalCyclicClassCoupling | Indicates the complexity of a module. Cyclic class coupling typically measures, "a depends on b" and "b depends on a". It may count all the cycles in the class dependency graph. |
| TotalGlobalVariables | Indicates the total number of global variables present in the module; is calculated for the entire module. |

Table 1 provides example code metrics that are not intended to be limiting. Any code metrics deemed relevant or useful by a user of system 100 may be employed. In general, the specific code metrics available for selection, the selected code metrics, and the methods for calculating the selected code metrics may not be critical to the present invention, but may be critical to the quality of code failure proneness estimation for a particular code set. Code metrics are typically selected so as to provide a meaningful estimation for the code set being evaluated, and are generally selected based on failures observed in a previous version of the software being evaluated.

Example code churn calculator 104 typically accepts as input code set 120 and baseline code set 130 and calculates measures and metrics of code churn, or various degrees of change in code set 120 relative to baseline code set 130. In one example, calculator 104 compares both input codes sets to determine measures representing New Blocks, Changed Blocks, Unchanged Blocks, and Deleted Blocks, where a block is generally a contiguous set of instructions in binary format. In an alternative example, lines of code (versus blocks) are used when analyzing code sets comprised of source files.

A New Block is typically defined as a contiguous set of instructions in code set 120 that did not exist in baseline code set 130. A Changed Block is typically defined as a contiguous set of instructions in code set 120 that corresponds to but is different in some manner from the corresponding block in baseline code set 130. An Unchanged Block is typically defined as a contiguous set of instructions in code set 120 that corresponds to and is identical to the corresponding block in baseline code set 130. A Deleted Block is typically defined as a contiguous set of instructions in baseline code set 130 for which the corresponding block does not exist in code set 120.

If no baseline code set is available then the code churn measures are typically set to zero by calculator 104. Further, the code churn measures may be normalized into code churn metrics M1, M2, and M3 as defined herein below.

$$M1 = \text{New Blocks} + \text{Changed Blocks}/\text{Total Blocks}$$

The M1 code churn metric quantifies code churn due to new code being added to code set 120 relative to baseline code set 130. A higher value for M1 typically indicates a higher potential defect density for the code set file being analyzed.

$$M2 = \text{Deleted Blocks}/\text{Total Blocks}$$

The M2 code churn metric quantifies code churn due to deleted code, or code deleted from code set 120 that existed in baseline code set 130. A higher value for M2 typically indicates a higher potential defect density for the code set file being analyzed.

$$M3 = \text{New Blocks} + \text{Changed Blocks}/\text{Deleted Blocks}$$

The M3 code churn metric quantifies new development in code set 120 relative to baseline code set 130; that is, code churn approximately due to changes other than for bug fixes to the code. A higher value for M3 typically indicates a higher degree of new development in code set 120 relative to baseline code set 130 for the code set file being analyzed. If Deleted Blocks equals zero, then typically an upper bound value for M3 is determined statistically.

Example statistical modeler 106 typically accepts as inputs code metrics, such as from code metrics calculator 102, and code churn metrics, such as from code churn calculator 104, and estimates failure proneness output 110. In one example, statistical modeler 106 typically uses a logistical regression technique to estimate a probability of code failure proneness. Such failure proneness is a probability measure between 0 and 1 and is defined as the probability that software embodied by code set 120 will fail in operation. The higher the failure proneness, the higher the probability of experiencing a software failure.

Modeler 106 typically builds a statistical model or logistical regression model for estimating failure proneness 110 based on a logistical equation of the general form:

$$\prod = \frac{e^{(c+a1M1+a2M2+a3M3+...+anMn)}}{1+e^{(c+a1M1+a2M2+a3M3+...+anMn)}}$$

where $\Pi$ is the probability of failure proneness 110; c is constant; a1, a2, etc are regression coefficients calculated from baseline code set 130 as stored in datastore 140; and M1, M2, etc are the corresponding code and/or code churn metrics selected and calculated from code set 120. Note that the terms M1, M2, M3, etc., do not necessarily represent any particular metric described herein, but represent metrics selected by statistical modeling for a specific code set. Such modeling involves correlation of code failures to code metrics. In one example, the constant and regression coefficients are determined using conventional statistical analysis system ("SAS") software. Failure proneness 100 typically represents the probability of failure for the software embodied by code set 120 as opposed to that of any one file from the code set.

Example HVMF calculator 108 typically accepts as inputs code metrics, such as from code metrics calculator 102, and code churn metrics, such as from code churn calculator 104, as well as corresponding baseline code metrics from datastore 140 and calculates bounds 112, HVMF factor 114, and classifications 116. For each calculated code metric (including code churn), calculator 108 determines a statistical lower bound, mean bound, and upper bound (bounds 112) based on the corresponding baseline code metrics. If the code metric is<=the mean bound, it is typically classified as green (low estimated risk of failure). If the code metric is>the mean bound and<the upper bound, then the metric is typically classified as yellow (medium estimated risk of failure). And if the code metric is<=the upper bound, it is typically classified as red (high estimated risk of failure). The HVMF factor 114 is typically calculated as the sum of all red metrics divided by the total number of calculated metrics. One example set of outputs of CFPE system 100 in a display format is shown in connection with FIG. 3.

Figure 2:
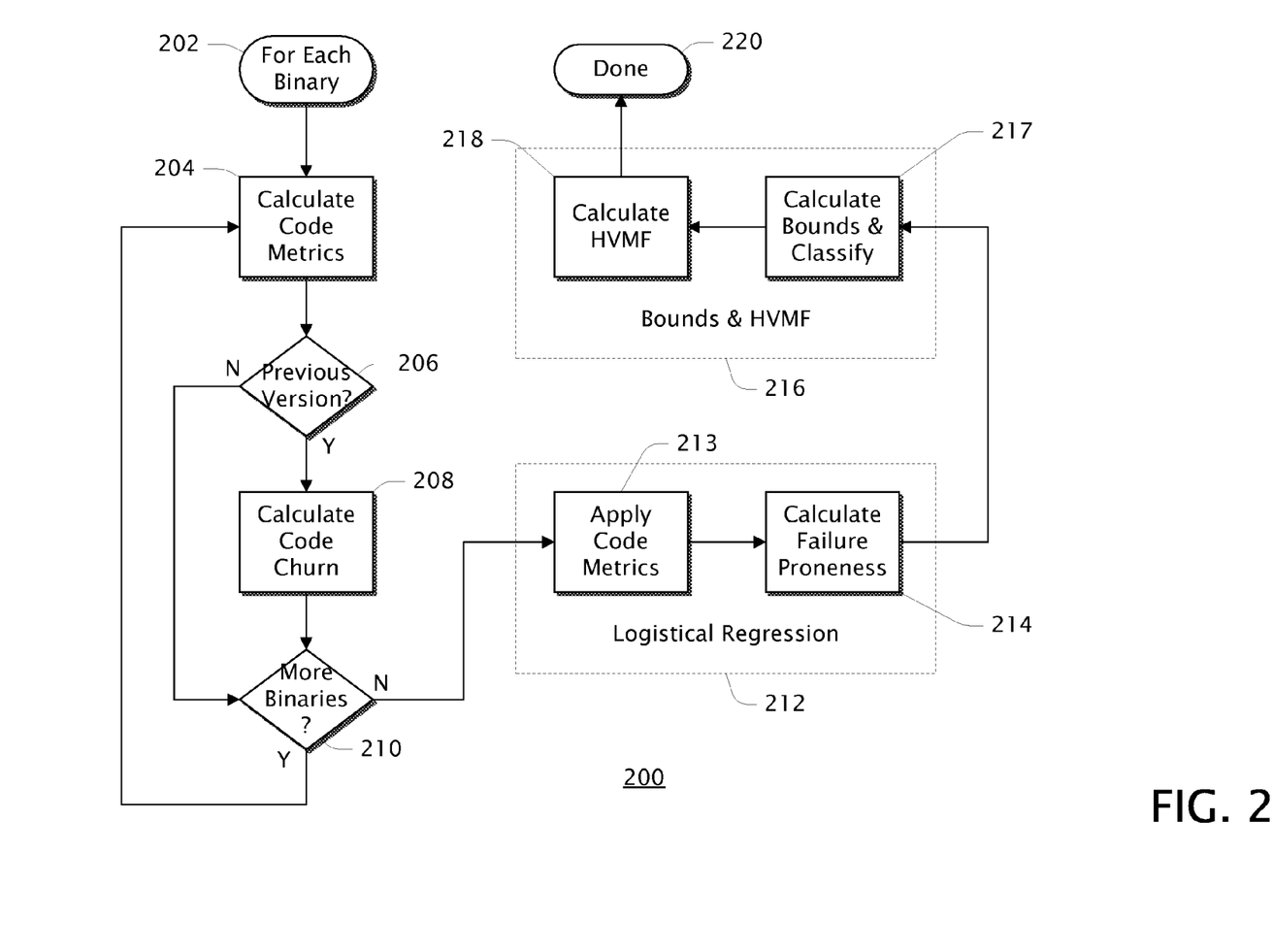
FIG. 2 is a block diagram showing an example method for estimating the failure proneness of a code set.

FIG. 2 is a block diagram showing an example method 200 for estimating the failure proneness of a code set. The code set may include source or binary files; binary files are considered in this example. Block 202 typically indicates the beginning of the method for processing each file in the code set. Method 200 typically continues at block 204 for each file in the code set. The code set described in connection with FIG. 2 corresponds to code set 120 of FIG. 1. The baseline code set described in connection with FIG. 2 corresponds to baseline code set 130 of FIG. 1. The previous version or baseline version of software described in connection with FIG. 2 corresponds generally to the previous version of software embodied in baseline code set 130 of FIG. 1.

For each file in the code set, block 204 typically indicates calculating selected code metrics. In one example, about 10 to 15 code metrics are selected for evaluation of a code set. The metrics are typically selected based on failure data from previous version of the software embodied by the code set, such as a baseline version. The code metrics selected are typically considered by a user to be the most relevant indicators of software quality, failure proneness, and/or the like. Once the code metrics for the file are calculated, method 200 typically continues at block 206.

For each file in the code set, block 206 indicates determining if a previous version or baseline code set exists. If no baseline code set file exists corresponding to the current code set file, then method 200 typically continues at block 210. If a baseline code set file does exist corresponding to the current code set file, method 200 typically continues at block 208.

For each file in the code set for which a corresponding baseline code set file exists, block 208 indicates calculating code churn metrics. In one example, code churn metrics are calculated as described in connection with code churn calculator 104 of FIG. 1. Once the code churn metrics are calculated, method 200 typically continues at block 210.

For each file in the code set, block 210 indicates checking to see if there are more unprocessed files in the code set. If there is another unprocessed file in the code set, method 200 typically continues at block 204 with the unprocessed file. Otherwise, method 200 typically continues at block 212 and performs a logistical regression for the entire code set.

Block 212 indicates applying a logistical regression model to the code set as indicated by blocks 213 and 214. Block 213 indicates applying the calculated code metrics to a logistical regression model. In one example, this may be done as described in connection with statistical modeler 106 of FIG. 1 Block 214 indicates calculating the failure proneness of code set. In one example, this may be done as described in connection with statistical modeler 106 of FIG. Once the logistical regression is complete, method 200 typically continues at block 216.

Block 216 indicates calculating statistical bounds and an HVMF factor based on the code set as indicated by blocks 217 and 218. Block 217 indicates calculating statistical upper, mean, and lower bounds based on a baseline code set corresponding to the code set. In one example, the statistical bounds are calculated and the code metrics of the codes set classified as described in connection with HVMF calculator 108 of FIG. 1. Block 218 indicates calculating an HVMF factor for the code set. In one example, the HVMF factor is calculated as described in connection with HVMF calculator 108 of FIG. 1. Once the statistical bounds are calculated, the code metrics are classified, and the HVMF factor is calculated, method 200 is done as indicated by block 220.

Figure 3:
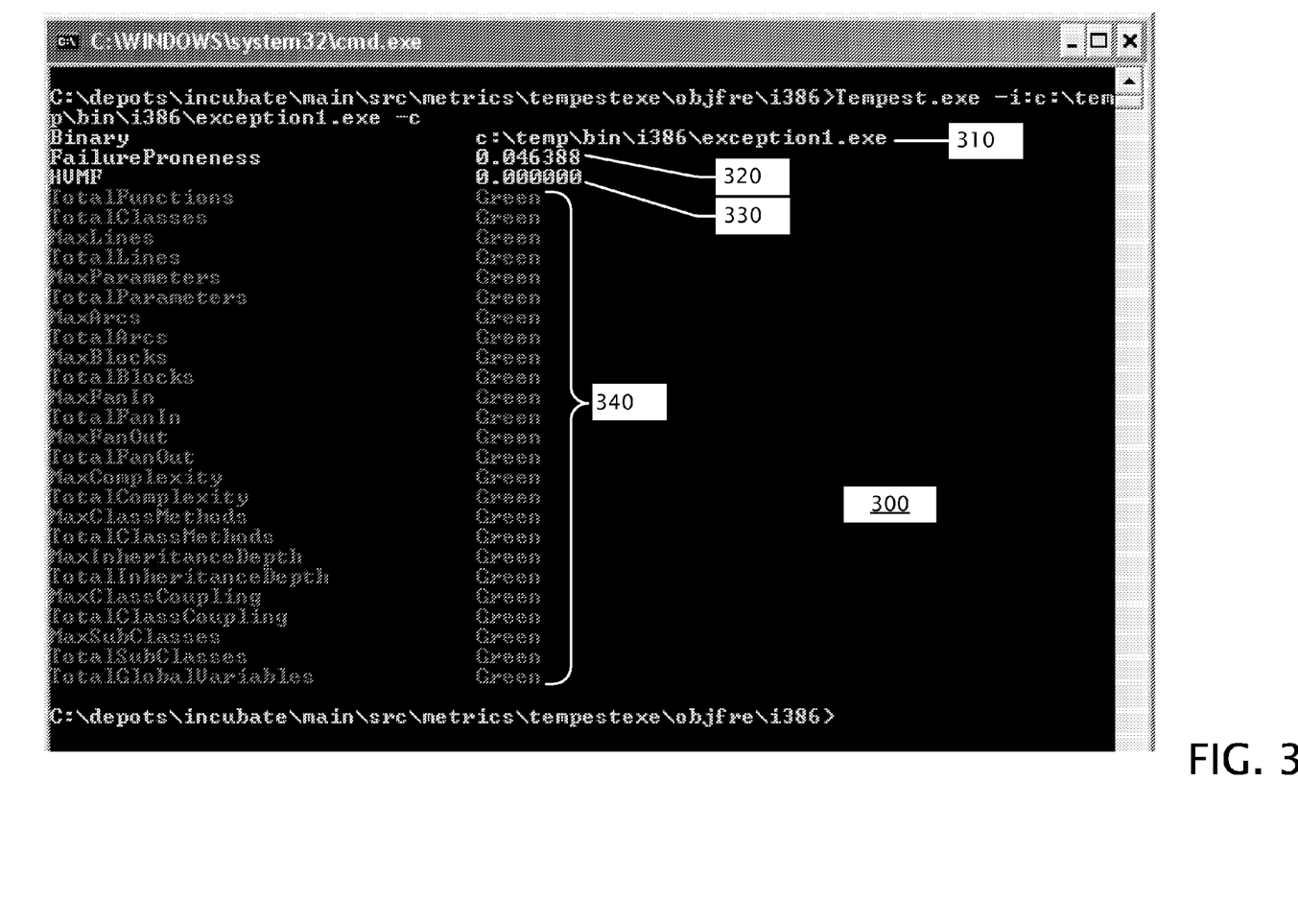
FIG. 3 is a screen shot showing an example output of an example CFPE system.

FIG. 3 is a screen shot 300 showing an example output of an example CFPE system. The output of a CFPE system, such as system 100 of FIG. 1, and/or the output of a code failure estimation method, such as method 200 of FIG. 2, may take any form suitable to communicate relevant information to a user. Screen shot 300 is intended only as an example and shall not be taken as limiting.

Line 310 indicates an example name of a file being evaluated, which in this example is: exception1.exe. Such a file may be one of a plurality of file forming a code set being evaluated; that is, for which a code failure proneness probability is being estimated.

Line 320 indicates an example failure proneness probability value for the file being evaluated. In another example, such a probability may be displayed for the entire code set and/or for each of the files of the code set. Such a probability generally indicates an estimated failure proneness during execution.

Line 330 indicates an example HVMF factor for the file being evaluated. In another example, such a factor may be displayed for the entire code set and/or for each of the files of the code set. Such a factor generally provides an indication of risk of failure during execution.

Lines 340 indicate the selected code metrics calculated for the file being evaluated. In general, the selected metrics will be calculated for every file in a code set. In this example, a classification of green is displayed for each code metric. In alternate examples, selected code metrics and their corresponding classifications may be displayed for the entire code set and/or for each of the files of the code set. Such classifications provide an indication of risk of failure during execution.

Figure 4:
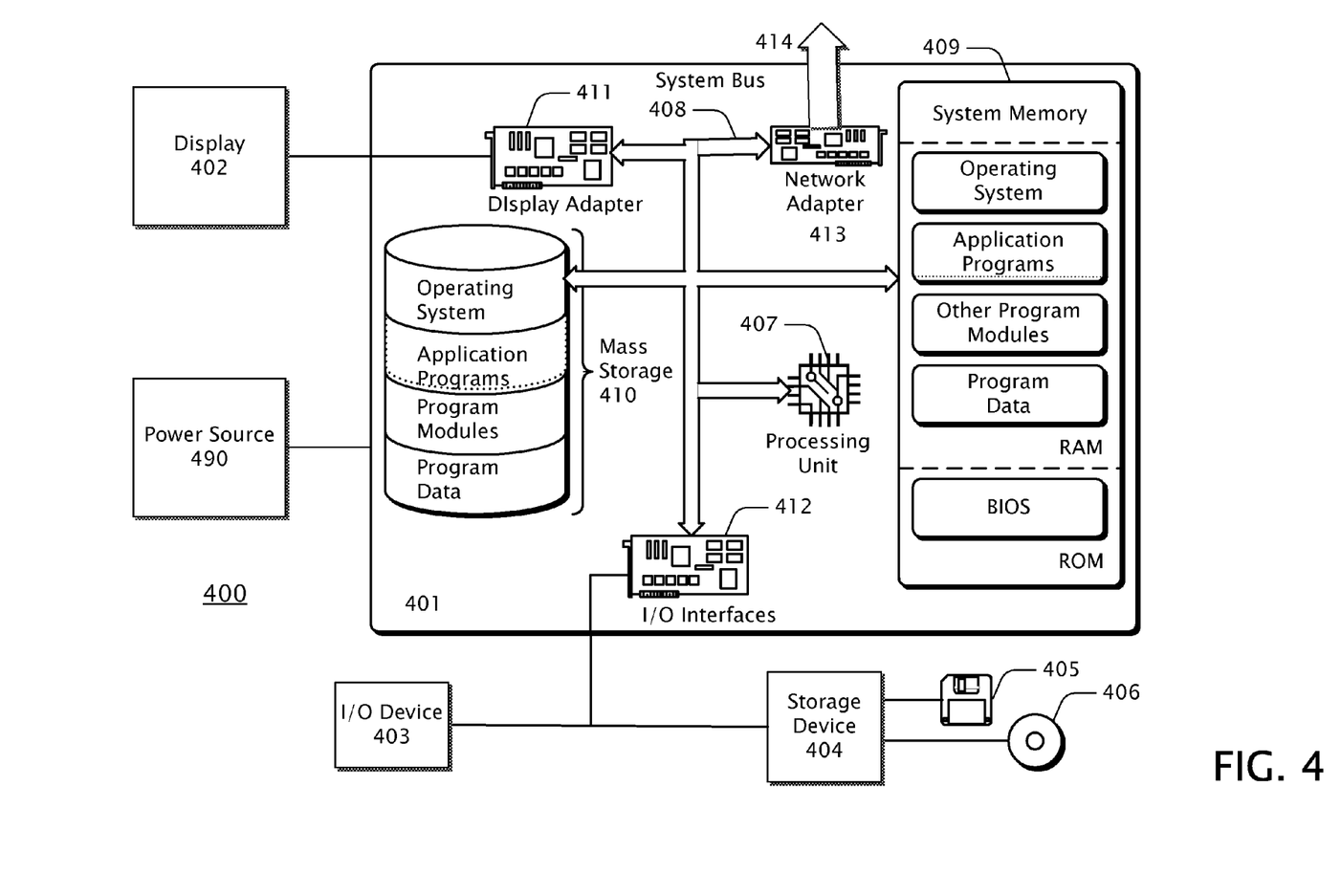
FIG. 4 is a block diagram showing an example computing environment in which the technologies, systems, and/or methods described herein may be implemented.

FIG. 4 is a block diagram showing an example computing environment 400 in which the technologies, systems, and/or methods described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, Internet services, web portals, and the like.

Computing environment 400 typically includes a general-purpose computing system in the form of a computing device 401 coupled to various components, such as peripheral devices 402, 403, 404 and the like. System 400 may couple to various other components, such as input devices 403, including voice recognition, touch pads, buttons, keyboards and/or pointing devices, such as a mouse or trackball, via one or more input/output ("I/O") interfaces 412. The components of computing device 401 may include one or more processors (including central processing units ("CPU"), graphics processing units ("GPU"), microprocessors ("μP"), and the like) 407, system memory 409, and a system bus 408 that typically couples the various components. Processor 407 typically processes or executes various computer-executable instructions to control the operation of computing device 401 and to communicate with other electronic and/or computing devices, systems or environment (not shown) via various communications connections such as a network connection 414 or the like. System bus 408 represents any number of several types of bus structures, including a memory bus or memory controller, a peripheral bus, a serial bus, an accelerated graphics port, a processor or local bus using any of a variety of bus architectures, and the like.

System memory 409 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 409 typically stores data, computer-executable instructions and/or program modules comprising computer-executable instructions that are immediately accessible to and/or presently operated on by one or more of the processors 407.

Mass storage devices 404 and 410 may be coupled to computing device 401 or incorporated into computing device 401 via coupling to the system bus. Such mass storage devices 404 and 410 may include non-volatile RAM, a magnetic disk drive which reads from and/or writes to a removable, non-volatile magnetic disk (e.g., a "floppy disk") 405, and/or an optical disk drive that reads from and/or writes to a non-volatile optical disk such as a CD ROM, DVD ROM 406. Alternatively, a mass storage device, such as hard disk 410, may include non-removable storage medium. Other mass storage devices may include memory cards, memory sticks, tape storage devices, and the like.

Any number of computer programs, files, data structures, and the like may be stored in mass storage 410, other storage devices 404, 405, 406 and system memory 409 (typically limited by available space) including, by way of example and not limitation, operating systems, application programs, data files, directory structures, computer-executable instructions, and the like.

Output components or devices, such as display device 402, may be coupled to computing device 401, typically via an interface such as a display adapter 411. Output device 402 may be a liquid crystal display ("LCD"). Other example output devices may include printers, audio outputs, voice outputs, cathode ray tube ("CRT") displays, tactile devices or other sensory output mechanisms, or the like. Output devices may enable computing device 401 to interact with human operators or other machines, systems, computing environments, or the like. A user may interface with computing environment 400 via any number of different I/O devices 403 such as a touch pad, buttons, keyboard, mouse, joystick, game pad, data port, and the like. These and other I/O devices may be coupled to processor 407 via I/O interfaces 412 which may be coupled to system bus 408, and/or may be coupled by other interfaces and bus structures, such as a parallel port, game port, universal serial bus ("USB"), fire wire, infrared ("IR") port, and the like.

Computing device 401 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 401 may be coupled to a network via network adapter 413 or the like, or, alternatively, via a modem, digital subscriber line ("DSL") link, integrated services digital network ("ISDN") link, Internet link, wireless link, or the like.

Communications connection 414, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 490, such as a battery or a power supply, typically provides power for portions or all of computing environment 400. In the case of the computing environment 400 being a mobile device or portable device or the like, power source 490 may be a battery. Alternatively, in the case computing environment 400 is a desktop computer or server or the like, power source 490 may be a power supply designed to connect to an alternating current ("AC") source, such as via a wall outlet.

Some mobile devices may not include many of the components described in connection with FIG. 4. For example, an electronic badge may be comprised of a coil of wire along with a simple processing unit 407 or the like, the coil configured to act as power source 490 when in proximity to a card reader device or the like. Such a coil may also be configure to act as an antenna coupled to the processing unit 407 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 402, I/O device 403, or many of the other components described in connection with FIG. 4. Other mobile devices that may not include many of the components described in connection with FIG. 4, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A code failure proneness estimation system comprising:
a processor;
a code metrics calculator implemented at least in part by the processor and configured to accept a code set and to calculate selected code metrics based on the code set, wherein the code set embodies a current version of software;
a code churn calculator implemented at least in part by the processor and configured to accept and to calculate from the code set and a baseline code set code churn metrics that indicate a degree of change in the code set relative to the baseline code set, wherein the baseline code set embodies a previous version of the software;
a historical variant metric feedback ("HVMF") calculator configured to accept the code set and the baseline code set and baseline data associated with the baseline code set and calculate an HVMF factor and classify the selected code metrics and the code churn metrics; and
a statistical modeler implemented at least in part by the processor and configured to accept the selected code metrics and the code churn metrics, and to perform a logistical regression resulting in a code failure proneness probability.

2. The system of claim 1 wherein the statistical modeler further accepts baseline data associated with the baseline code set and the code failure proneness probability is a value that is relative to the previous version of the software.

3. The system of claim 1 wherein the logistical regression is based on an equation of the form:

$$\prod = \frac{e^{(c+a1M1+a2M2+a3M3+...+anMn)}}{1+e^{(c+a1M1+a2M2+a3M3+...+anMn)}}$$

where $\prod$ is the estimated probability of failure proneness, and where c is a constant, and where terms M1, M2, M3, and Mn correspond to various code metrics, including code churn metrics, calculated from the code set, and where terms a1, a2, a3, and an represent various regression coefficients calculated from the baseline code set.

4. The system of claim 1 wherein the code set includes binary files.

5. The system of claim 1 wherein the code churn metrics include M1, M2, and M3 where:

$M1$=New Blocks+Changed Blocks/Total Blocks;

$M2$=Deleted Blocks/Total Blocks;

$M3$=New Blocks+Changed Blocks/Deleted Blocks; and wherein each of the New Blocks is a contiguous set of instructions in the code set without a corresponding contiguous set of instructions in the baseline code set, and wherein each of the Changed Blocks is a contiguous set of instructions in the code set that corresponds to but is modified from a corresponding contiguous set of instructions in the baseline code set, and wherein each of the Deleted Blocks is a contiguous set of instructions in the baseline code set without a corresponding contiguous set of instructions in the code set.

6. The system of claim 5 wherein a block is a contiguous set of instructions.

7. A method for estimating a probability of failure proneness of a code set, the method comprising:
calculating, from each file in the code set and in a baseline code set, selected code metrics and code churn metrics that indicate a degree of change in the code set relative to the baseline code set, wherein the code set embodies a current version of software, and wherein the baseline code set embodies a previous version of the software;
applying a logistical regression model to the calculated selected code metrics and the calculated code churn metrics, wherein the logistical regression is based at least in part on baseline data associated with the baseline code set;
calculating statistical bounds based on a portion of the selected code metrics that are based on the baseline code set;
calculating a historical variant metric feedback factor based on the applied logistical regression model and the calculated statistical bounds; and
wherein the method is performed by a computer.

8. The method of claim 7 wherein the logistical regression is based on an equation of the form:

$$\prod = \frac{e^{(c+a1M1+a2M2+a3M3+\ldots+anMn)}}{1+e^{(c+a1M1+a2M2+a3M3+\ldots+anMn)}}$$

where $\prod$ is the estimated probability of failure proneness, and where c is a constant, and where terms M1, M2, M3, and Mn correspond to various code metrics, including code churn metrics, calculated from the code set, and where terms a1, a2, a3, and an represent various regression coefficients calculated from the baseline code set.

9. The method of claim 7 wherein the statistical bounds include a statistical lower bound, a statistical mean bound, and a statistical upper bound.

10. The method of claim 9 further comprising classifying each of the selected code metrics and the code churn metrics (each referred to as a code metric) as green or yellow or red where:
  green represents the code metric being<=the mean bound;
  yellow represents the code metric being>the mean bound and<the upper bound; and
  red represents the code metric being<=the upper bound.

11. The method of claim 10 wherein the historical variant metric feedback factor is defined as the sum of all red code metrics divided by the total number of code metrics.

12. The method of claim 7 wherein the code set is comprised of binary files.

13. The method of claim 7 wherein the code churn metrics are based at least in part on the baseline data set.

14. The method of claim 7 further comprising calculating the estimated probability of failure proneness based at least on the applied logistical regression model.

15. At least one computer-readable storage medium embodying computer-executable instructions sufficient to cause a computing environment to perform a method for estimating the failure proneness of a code set, the method comprising:
  calculating, from each file in the code set and in a baseline code set, code metrics and code churn metrics that indicate a degree of change in the code set relative to the baseline code set, wherein the code set embodies a current version of software, and wherein the baseline code set embodies a previous version of the software;
  applying a logistical regression model to the calculated code metrics and the calculated code churn metrics, wherein the logistical regression is based at least in part on baseline data associated with the baseline code set;
  calculating a statistical lower bound, a statistical mean bound, and a statistical upper bound based on a portion of the code metrics that are based on the baseline code set;
  calculating a historical variant metric feedback factor based on the applied logistical regression model and the calculated statistical bounds;
  calculating a code failure proneness probability based on the applied logistical regression model; and
  classifying the code metrics and the code churn metrics.

16. The at least one computer-readable storage medium of claim 15 wherein the code set is comprised of one or more binary files.

* * * * *